United States Patent [19]

Stark

[11] Patent Number: 4,671,159

[45] Date of Patent: Jun. 9, 1987

[54] CHORD KEY FOR MUSICAL INSTRUMENTS

[76] Inventor: Johan Stark, Ringvägen 90, S-116 61 Stockholm, Sweden

[21] Appl. No.: 919,261

[22] PCT Filed: Jan. 14, 1986

[86] PCT No.: PCT/SE86/00011

§ 371 Date: Sep. 12, 1986

§ 102(e) Date: Sep. 12, 1986

[87] PCT Pub. No.: WO86/04177

PCT Pub. Date: Jul. 17, 1986

[30] Foreign Application Priority Data

Jan. 14, 1985 [SE] Sweden .................................. 8500161

[51] Int. Cl.$^4$ ............................................. G10G 1/02
[52] U.S. Cl. ..................................... 84/485 R; 84/474
[58] Field of Search .................... 84/471 SR, 473, 474, 84/480, 485

[56] References Cited

U.S. PATENT DOCUMENTS 3,712,167  1/1973  Renault ........................... 84/485 SR
3,903,781  9/1975  Leonard ........................... 84/471 R
3,903,782  9/1975  Leonard ........................... 84/471 R
4,069,735  1/1978  Bertram ........................... 84/474
4,503,748  3/1985  Barber ............................. 84/474

Primary Examiner—Lawrence R. Franklin
Attorney, Agent, or Firm—Townsend and Townsend

[57] ABSTRACT

The invention refers to a chord key for musical instruments comprising a number of plastic sheets (1) that are rotatably connected together about a common axis and provided with marks (7) to show fingering positions on the instrument for the positions of the notes included in various chords. Each sheet (1) with fingering marks for note positions is transparent and corresponds to all possible positions for a particular note in various chords, and is also provided with its own special mark for differentiating between the various possible grips of the chord. A bottom sheet (2) is likewise rotatably attached to the other sheets and depicts the fretboard or manual of the instrument, whereby all possible fingering positions for a particular chord in which particular notes are included, are obtainable by turning those sheets out that correspond to the notes of the chord and by positioning these sheets on to of the fretboard sheet.

7 Claims, 5 Drawing Figures

CHORD KEY FOR MUSICAL INSTRUMENTS

The invention refers to a chord key for musical instruments comprising a number of plastic sheets rotatably connected together and provided with marks to show fingering positions on the instrument corresponding to the positions of the notes included in various chords. The chord key is used for determining all possible grips on a musical instrument (guitar, piano, mandolin, banjo, ukulele and others) so as to achieve a desired polyphonic composition of notes or a chord, as it is called. The invention is also intended for determining by means of the said device the notes which are included in a large number of chords.

The chord key can also be used in the teaching of music, and in the composing and arranging of music.

The invention is made in a special design for each instrument it is intended for. Suitable instruments are string instruments such as the guitar and the like and keyboard instruments such as the piano and the like. The device described here is intended for the guitar.

The problem that the invention intends to solve consists in finding, starting from a desired harmonic structure (chord) and also a number of secondary conditions such as bass, melody and the like, a method for or a grip on the instrument in question by which this is achieved.

Traditionally, this problem has been solved by chord books, as they are called, that consist of a greater or lesser number of selections of chord grips. There are also prior patent applications for various kinds of devices, but none of these can be considered to have all the advantages of the device proposed herein. More details of these other devices are described below in connection with the search for prior art.

The chord key according to the invention is essentially characterized in that each sheet with fingering marks is transparent and corresponds to all possible positions for a particular note in various chords and that each sheet is provided with its own special mark for distinguishing that note in the various possible grips of the chord, and also that a bottom sheet is likewise rotatably attached to the other sheets and depicts the fretboard or manual of the instrument, whereby all possible fingering positions for a particular chord in which particular notes are included, are obtained by turning out those sheets which correspond to the notes of the chord and by positioning these sheets on top of the fretboard sheet.

The proposed chord key is very small and straightforward in design, which is not the case with the devices referred to above. With the chord key according to the invention all possible chords are displayable in all their inversions. This makes it possible to select from a large number of possible grips for a particular chord, a grip that satisfies one or more secondary conditions. For instance, a particular note in the bass or a particular melody note in the upper part, etc. may be desired. With the aids referred to earlier, this selection seems a good deal more difficult and consequently will consume much more time.

There are a number of different, well-known inventions of patented chord keys. An investigation has shown that there are theoretically, great similarities to EP No. 29463 and U.S. Pat. No. 3,712,167 but in these documents a quite different design of device is described. Both are based on a principle of displacing in parallel a number of sheets or the like. This design is a good deal clumsier and bulkier and also more expensive to manufacture. Two documents, U.S. Pat. No. 3,972,293 and U.S. Pat. No. 3,884,110, have great similarities to the inventive device as far as the design is concerned. Both describe a number of rotatable sheets, but these devices are intended to solve other theoretical problems than the device according to the invention. All other documents can be regarded as irrelevant. On the market there are, on the one hand, a number of very simple rotary slide rule constructions, as they are called, and on the other, a number of electronic aids. The first type must be regarded as clearly differing from the device according to the invention as far as design is concerned, and is in addition not at all so versatile and sophisticated as the device according to the invention. The second type also differs as to design but is intended for solving the same theoretical problems as the proposed device. The electronic type has a window similar to what we have called the bottom sheet. In this window various grip possibilities for a large number of chords are displayable by means of push buttons. This of course a very elegant design but a good deal more expensive to make. In addition the device according to the invention gives a clear picture of how the chords are composed and is therefor superior to hitherto known chord keys from an educational point of view. None of the prior art solutions manages to include in one device:

The possibility of displaying all possible chords in all their inversions, that all the inversions of a chord are displayed simultaneously, that the function of the notes in the chord are displayed, the possibility of displaying the relationship between two chords simultaneously, and a compact, robust and inexpensive design.

One exemplary embodiment of the chord key according to the invention for a string instrument is described in detail below with referens to the accompanying drawings, in which FIG. 1 is a view of the chord key in closed position.

Figure 1:
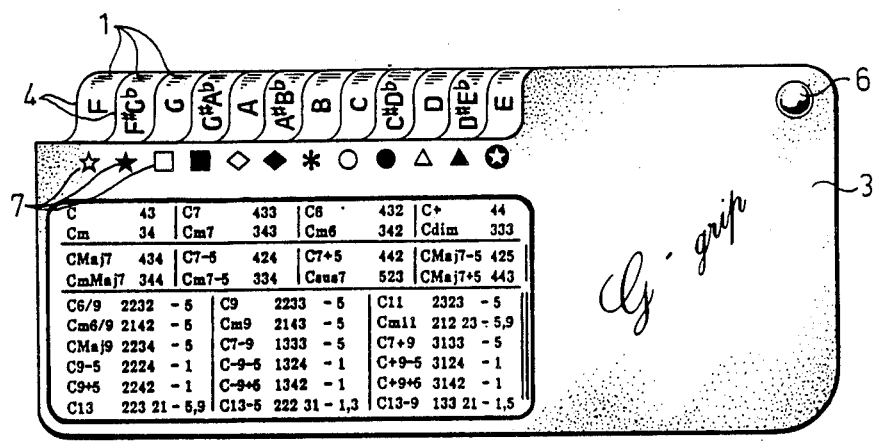
Figure 2:
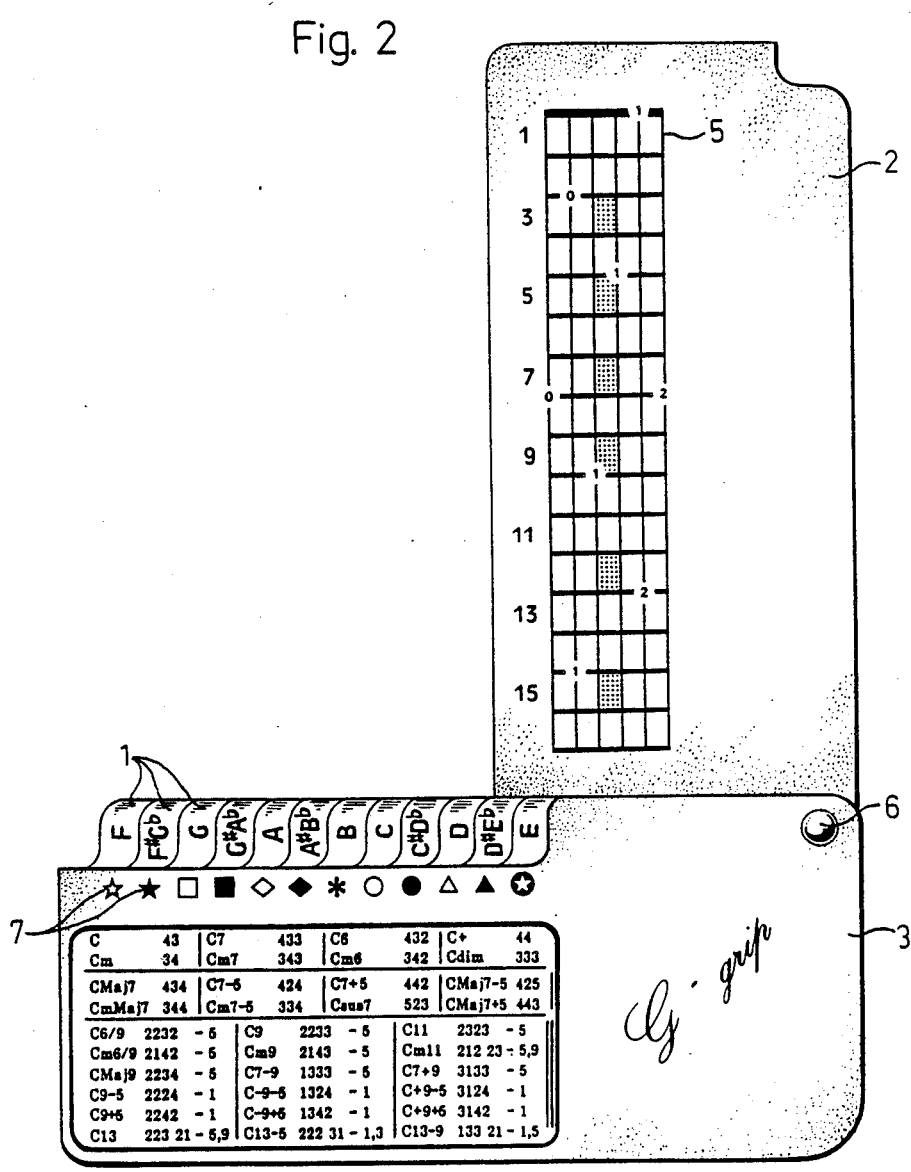
FIG. 2 is a view of the key with the fret board sheet turned out.
Figure 3:
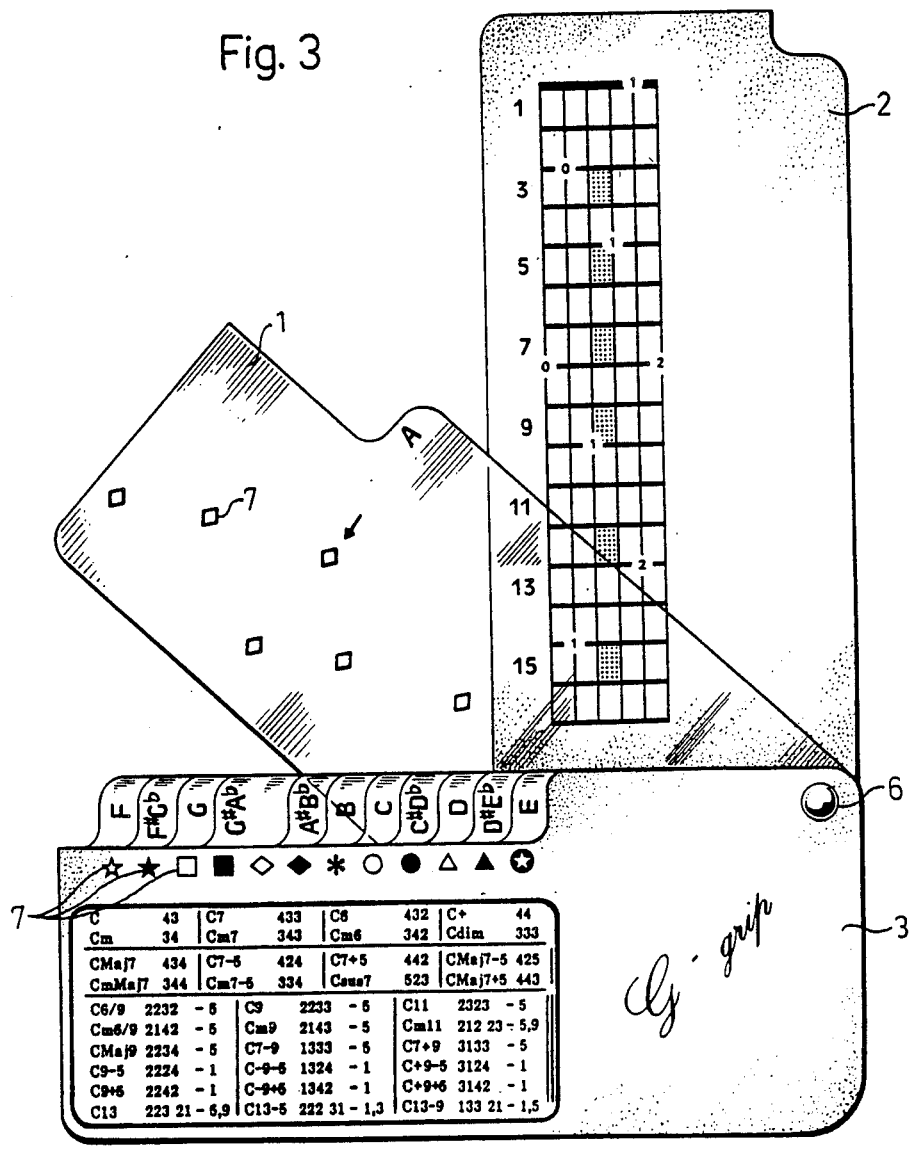
FIG. 3 is a view of the key as shown in FIG. 2, with a transparent sheet with fingering marks for note positions partly turned forward.
Figure 4:
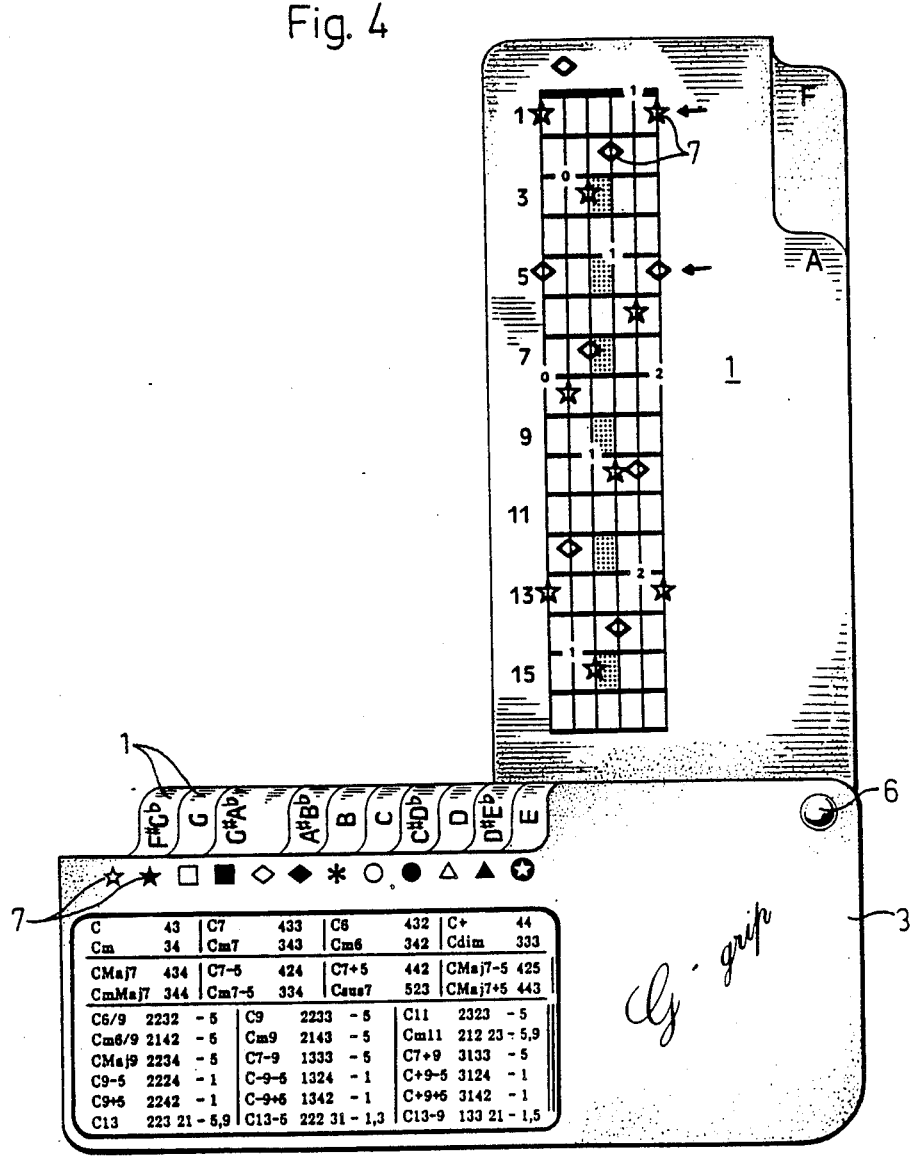
FIG. 4 is a view of two sheets with fingering marks for the notes A and F respectively, placed on top of the fret board sheet.

As is apparent from the figures, the chord key comprises a number of rotatable plastic sheets 1, one sheet for every chromatic step of the scale as well as a bottom sheet 2 (FIG. 2) and a front sheet 3 and also a blank recording sheet, that is to say a total of 15 sheets. The inner sheets are transparent and arranged in chromatic order. Every sheet of this type has an indentation 4 so that an arrangement resembling a thumb-index is obtained. This facilitates the selection of a desired sheet. At the very bottom is the bottom sheet 2, upon which is drawn (FIG. 2) an empty fretboard 5 (or manual). All the sheets are riveted together at one corner so that they can be turned out like a fan. Thus the fretboard sheet can be separated from the other sheets, whereupon a selection of the latter can be obtained with which to cover the same (FIG. 3). On the transparent sheets all positions for the corresponding note are marked 7, so that if such a sheet is turned out and placed on top of the fretboard sheet, all grip positions on the instrument that give this note can be observed. Hence, if more sheets are selected, all grip positions for a polyphonic combination (chord) can be observed. The marks 7 are different on different sheets (FIG. 4), so it is easy to distinguish all possible grips that give the right chord. Every grip where at least one of each note (that is to say, sheet) included occurs, is thus a possible combination. It is therefor easy to select a grip that satisfies one or more secondary conditions like, for example, that a particular note is wanted in the bass, and so on. This possibility of selecting is not present if a chord book is used in which all the chords are chosen in advance and arranged in a way that seldom allows of the free selection of secondary conditions.

Figure 5:
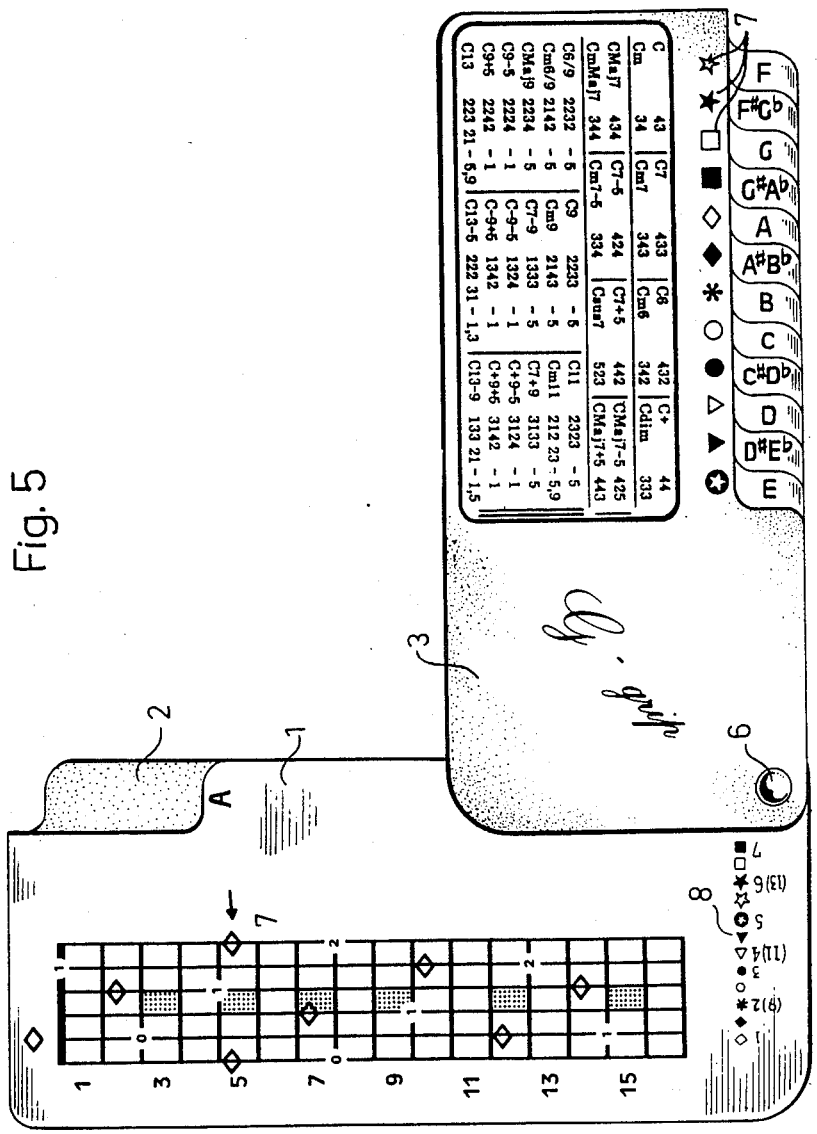
FIG. 5 is a view of a sheet with fingering marks completely raised having an auxiliary table for identification of chord note functions.

On each sheet there is a small table 8 (FIG. 5) that is visible if the sheet is turned out 180 degrees from its initial position. This table identifies the function of the various symbols, that is to say, notes in the corresponding key. Thus 1 denotes a root, 2 a second, 3 a third, etc. On account of this, a chord produced can be analysed and the different significance of the notes included in it, determined. With the table an arbitrary chord can also be composed by selecting the sheets whose functions are indicated in the table. In order to select a C major chord the table on the C sheet must be used, and the sheets corresponding to the numbers 1, 3 and 5 will together give a major C chord. With this technique, then, any chord is producible.

Anyone unfamiliar with the theory of chords can use yet another table that is to be found on the front sheet or cover. This table has been given C as its root but any other note is substitutable. The numbers to the right of the type of the chord show which sheets to select to find the corresponding chord. Take, for instance, the chord of F minor. First the corresponding chord in C, that is to say C minor, is looked up. There we find the numbers 3 and 4. Now, starting from the sheet marked F, we take first three steps (sheets) forward, which brings us to A flat, and then four more steps, which brings us the note C. Thus the chord of F minor comprises the notes F, A flat and C. Now these notes can be turned out together with the fretboard sheet, whereupon all conceivable variations of grips that give F minor become visible. These then consist of at least one of each of the notes included in it. Most other chords can be selected likewise, with the quick selection list.

The device is made so that the principle of adjacency, as it is called, will be easy to follow in a chord sequence. This prescribes that the transition between two chords following one upon the other, be made with the least possible movement, that is to say, in the most direct way.

This can be achieved by means of a blank recording sheet just beneath the front sheet. Upon this can be recorded a selected fingering combination for a particular chord. So when the next chord is taken up, it can be compared with the previous chord on the recording sheet, whereupon the nearest possible grip for the new chord is easy to find.

I claim:
1. A chord key for musical instruments comprising:
a plurality of transparent sheets;
means for rotatably connecting said sheets together;
one of said sheets depicting the fingering surface of a musical instrument; and
each of the remaining sheets having fingering marks thereon located such that when said each sheet is aligned with said one sheet, said fingering marks indicate the fingering positions on said fingering surface of one particular note, each sheet having marks indicating a different note than the rest of said remaining sheets,
whereby one or more of said remaining sheets may be aligned with said one sheet to display the fingering positions of a single note or of a plurality of notes.
2. The chord key of claim 1 wherein said particular notes include all the notes of a chromatic scale.
3. The chord key of claim 1 wherein the means for rotatably connecting said transparent sheets is located at a common corner of said sheets.
4. The chord key of claim 1, wherein said one sheet is the bottom sheet.
5. The chord key of claim 1 wherein said fingering marks include all possible fingering positions for the playing surface depicted.
6. The chord key of claim 1 wherein said playing surface is the fretboard of a stringed musical instrument.
7. The chord key of claim 6 wherein said stringed musical instrument is a guitar.

* * * * *